United States Patent
Waldeck et al.

(10) Patent No.: US 7,105,079 B2
(45) Date of Patent: Sep. 12, 2006

(54) PROCESS AND APPARATUS FOR MANUFACTURING METAL OXIDES AND BYPRODUCT HYDROGEN

(75) Inventors: Gary C. Waldeck, Racho Palos Verdes, CA (US); Romuald Drlik, Apache Junction, AZ (US)

(73) Assignee: Spheric Technologies, Inc., Paradise Valley, AZ (US)

( * ) Notice: Subject to any disclaimer, the term of this patent is extended or adjusted under 35 U.S.C. 154(b) by 0 days.

(21) Appl. No.: 10/794,070

(22) Filed: Mar. 4, 2004

(65) Prior Publication Data

US 2005/0194247 A1 Sep. 8, 2005

(51) Int. Cl.
*B01J 19/08* (2006.01)
*C01B 3/08* (2006.01)

(52) U.S. Cl. ........................ 204/164; 423/592
(58) Field of Classification Search ................ 204/164; 423/592
See application file for complete search history.

(56) References Cited

U.S. PATENT DOCUMENTS 3,355,279 A * 11/1967 Ishibashi ..................... 75/345
5,813,222 A * 9/1998 Appleby ...................... 60/274
5,826,548 A * 10/1998 Richardson, Jr. .............. 123/3
6,852,237 B1 * 2/2005 Green .......................... 210/749

FOREIGN PATENT DOCUMENTS

EP 0055134 B1 * 4/1986
JP 03231199 A * 10/1991

OTHER PUBLICATIONS

Kumar et al., "RESA—A wholly new process for fine oxide powder preparation", Journal of Materials Research, 3(6), Nov./Dec. 1988, pp. 1373-1377.*

* cited by examiner

*Primary Examiner*—Kishor Mayekar
(74) *Attorney, Agent, or Firm*—Drummond & Duckworth

(57) ABSTRACT

High purity metal oxide products and byproduct hydrogen are manufactured by immersing sacrificial electrodes, formed of the metal moiety of the metal oxide product, in water and striking an electrical arc between the electrodes. The metal oxide product and hydrogen are formed at the electrical arc plasma zone between the electrodes.

1 Claim, 5 Drawing Sheets

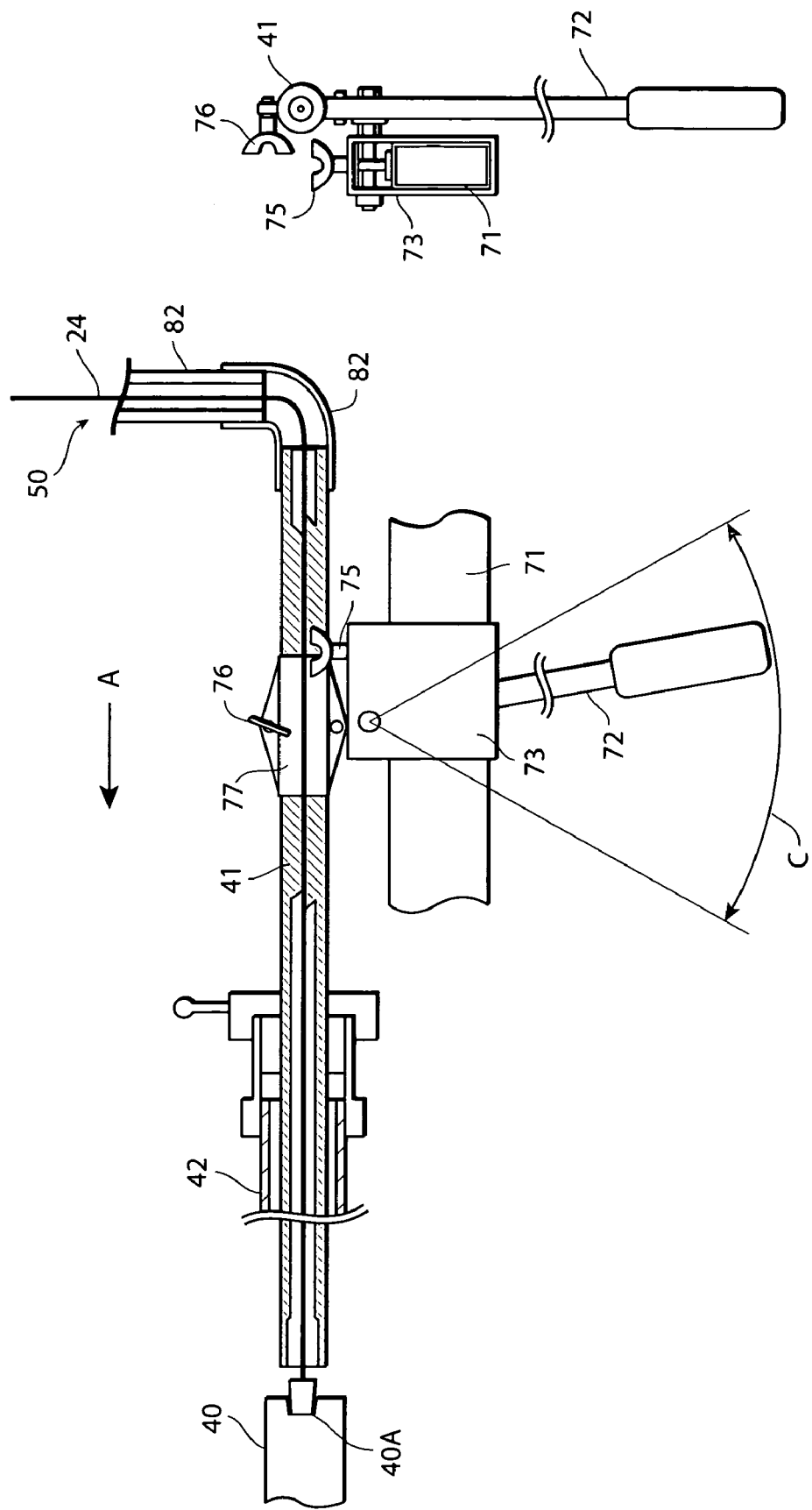

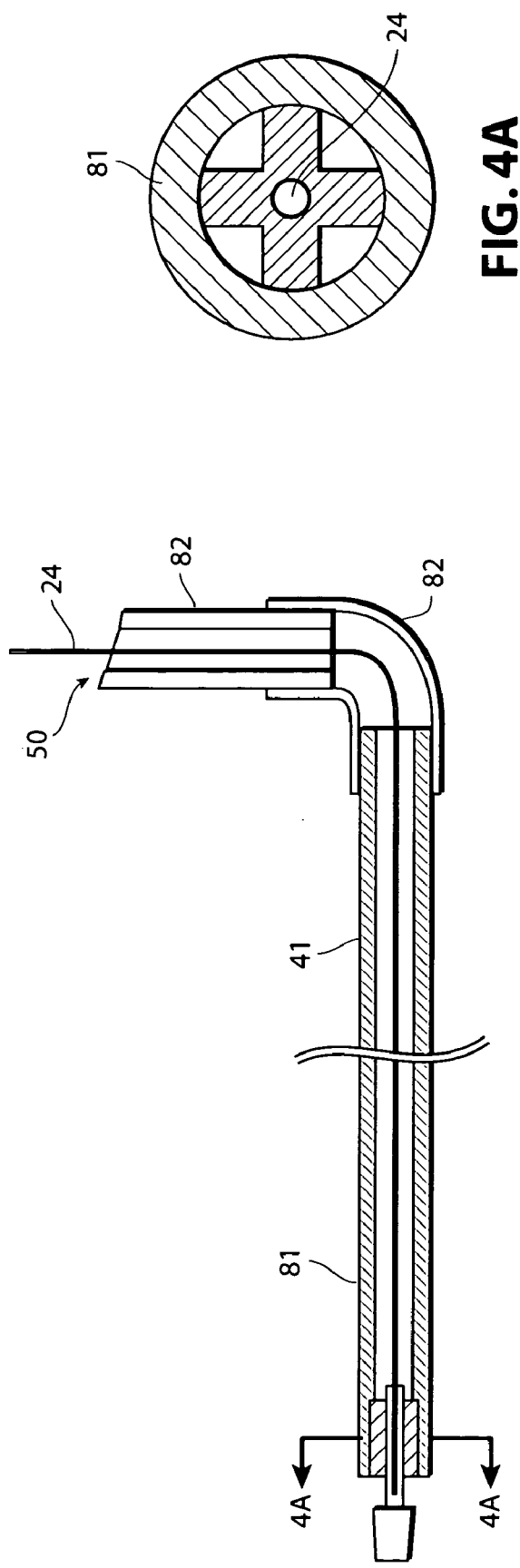
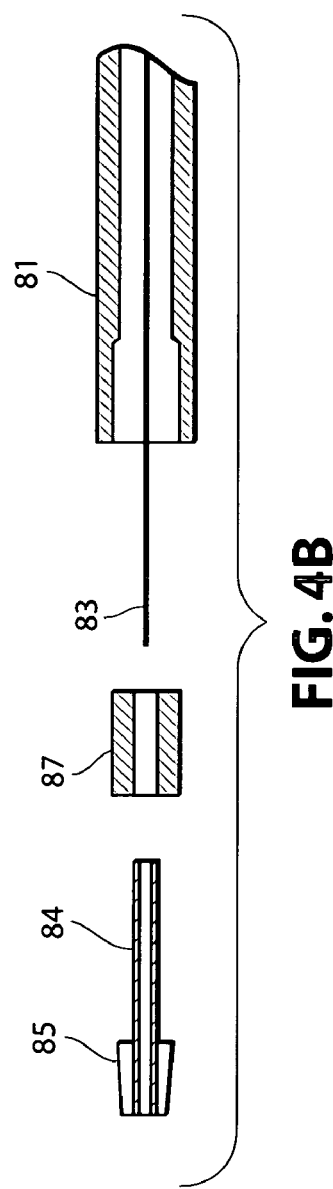
FIG. 4A
FIG. 4
FIG. 4B

PROCESS AND APPARATUS FOR MANUFACTURING METAL OXIDES AND BYPRODUCT HYDROGEN

This invention relates to processes and apparatus for manufacturing metal oxide products and byproduct hydrogen.

More particularly, the invention concerns an electrochemical process in which the metal oxide is formed from sacrificial electrodes immersed in water, at an electrical arc plasma zone between the electrodes.

In another and more particular respect the invention pertains to such processes, in which the electrical arc plasma zone is continuously maintained and the metal oxide and byproduct hydrogen are continuously formed at the plasma zone.

According to a further aspect, the invention relates to apparatus useful in practicing such continuous processes.

These and other, further and more particular aspects of the invention will be apparent to those skilled in the art from the following description thereof, in which:

BRIEF DESCRIPTION OF THE DRAWINGS

FIG. 2A is a sectional view of the apparatus of FIG. 2, taken along section line 2A—2A thereof;

FIG. 3 depicts the electrode positioning mechanism of the apparatus of FIG. 1.

FIG. 4 is a more detailed view of the electrode bus of FIG. 1.

FIG. 4A is sectional view of the electrode bus of FIG. 4, taken along section line 4A—4A thereof;

FIG. 4B is an exploded view of the apparatus of FIG. 4; and

FIELD OF THE INVENTION

Figure 1:
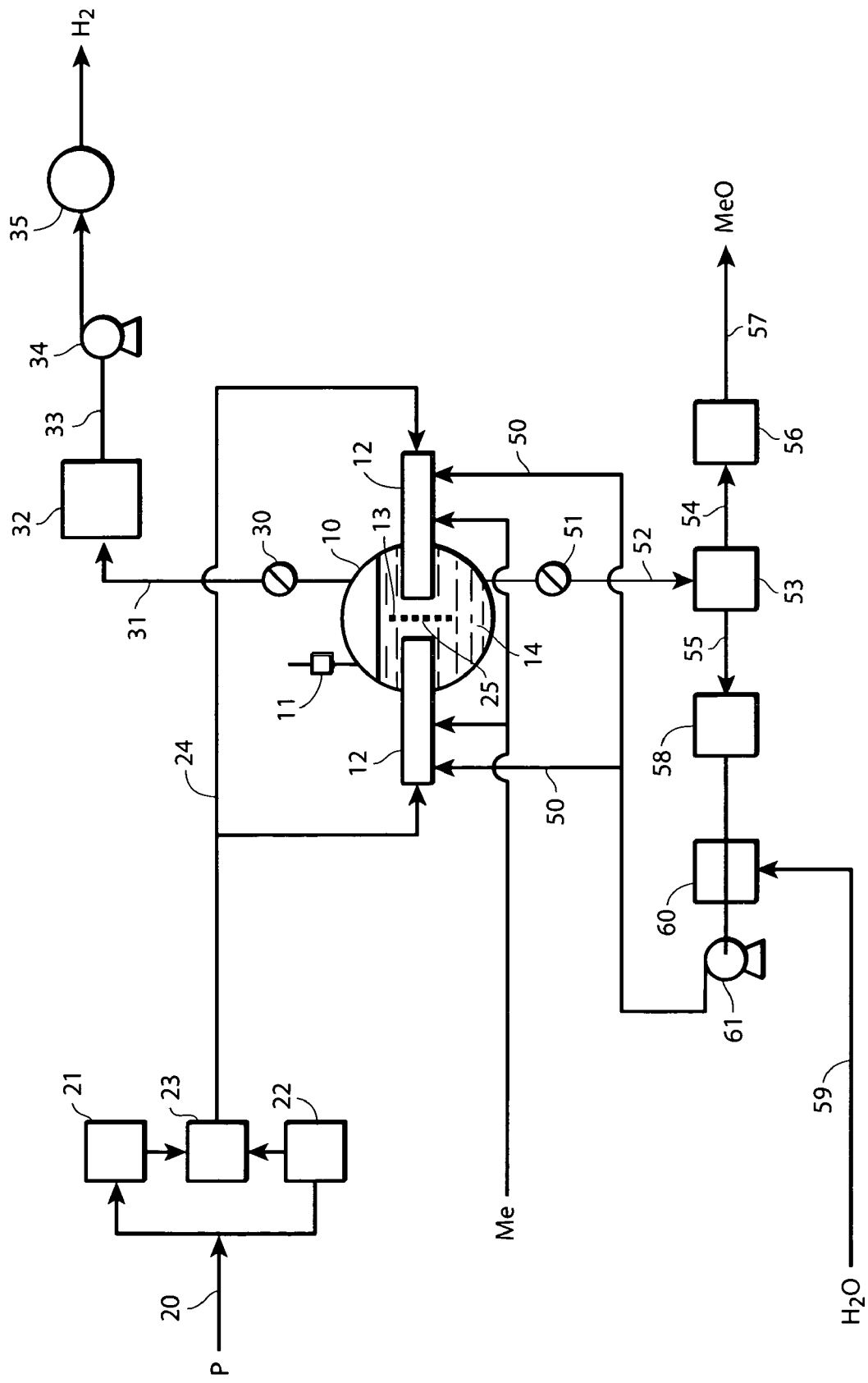
FIG. 1 is a flow sheet depicting the various steps of the processes of the invention.

There is an ever increasing commercial demand for metal oxides, especially high-purity products. For example, compounds such as cadmium oxide are widely used in rechargeable batteries for industrial emergency instrumentation, as in power transformer stations, airport runways, railroad switching equipment, etc., and aluminum oxide has wide usage, for example, in the food and chemical industries in manufacturing spark plugs, in industrial abrasives, etc. This invention pertains to processes and apparatus useful in manufacturing metal oxide products and which produce useful byproduct hydrogen.

THE PRIOR ART

Various prior processes for manufacturing metal oxides include calcining of naturally occurring ores, chemical precipitation, electroexplosion, hydrothermal processes, etc., which require large, complicated and expensive fixed manufacturing equipment and which have high raw material and operating expenses.

U.S. Pat. No. 6,506,493 describes a process for manufacturing manganese oxide by laser pyrolysis of an aerosol of the oxide precursor.

Published USA Application 20040009118A1 describes producing metal oxide particles by generating an aerosol of the solid metal, injecting the aerosol into a microwave plasma zone to vaporize the particles and then injecting the heated metal particles into a cooler oxygen-containing zone where the metal is oxidized and then condenses to form particles of the metal oxide product.

EP 1308417A3 discloses production of a metal oxide by controlled heating a metal salt of a carboxylic acid.

Published USA Application 20030167796A1 describes a thermal process for producing metal oxide by burning a flame formed from a combustible gas containing a metal oxide precursor.

U.S. Pat. No. 5,789,696 discloses a method of propelling a projectile in which the propellant chamber contains water, an aluminum wire and powdered aluminum. The aluminum wire is exploded by an electrical pulse, thermally initiating a reaction between the aluminum powder and the water, producing large quantities of hydrogen which propels the projectile. This technology is not directed to the production of metal oxides. A similar process, for production of hydrogen, is disclosed in U.S. Pat. No. 5,143,047.

Molten aluminum is reacted with water vapor in the process described in U.S. Pat. No. 3,985,866.

BRIEF DESCRIPTION OF THE INVENTION

It would be highly desirable to provide manufacturing processes and apparatus for preparing high-purity metal oxide products, using relatively simple processing equipment which has relatively low operating costs and using readily available relatively low-cost raw materials.

We have now discovered such processes and apparatus, which are used to manufacture high purity metal oxides and byproduct hydrogen by the electrical plasma-phase reaction of an elemental metal and water, to produce the corresponding metal oxide product and byproduct hydrogen.

Briefly, the process for manufacturing a metal oxide product and byproduct hydrogen includes the steps of positioning spaced sacrificial electrodes, formed from the elemental metal of said metal oxide product, in a reaction zone; introducing sufficient water into said reaction zone to cover the electrodes; applying an electrical potential to the electrodes sufficient to generate an arc therebetween, forming an electrical discharge plasma zone in the water between the electrodes; withdrawing from said reaction zone a mixture of water and the metal oxide-product formed at said plasma zone, separating the metal oxide product from the withdrawn water-metal oxide mixture and withdrawing from the reaction zone the hydrogen byproduct formed at the plasma zone.

In the presently preferred embodiment of the process of the invention, the electrical potential between the electrodes is regulated to continuously maintain the current density of the arc, thereby continuously maintaining and the plasma zone formed between the electrodes, and the metal oxide and byproduct hydrogen are continuously formed at the plasma zone.

According to another aspect of the invention, apparatus is provided to continuously manufacture a metal oxide product and byproduct hydrogen. The apparatus of the invention includes a fluid-tight reaction vessel, sacrificial electrodes formed of the elemental metal of the metal oxide product, positioned axially spaced apart in the reaction vessel; means for supplying water to the reaction vessel sufficient to cover the electrodes; means for applying and regulating an electrical current between the electrodes, to create and continuously maintain an electrical arc plasma zone therebetween; means for withdrawing a mixture of the metal oxide product, formed at said plasma zone, from the reaction vessel; and means for withdrawing the hydrogen byproduct, formed at the plasma zone, from the reaction vessel.

DETAILED DESCRIPTION OF THE INVENTION

Referring now to the drawings, in which like reference numerals identify the same elements in the several views, FIG. 1 is a flow sheet which illustratively depicts various items of processing equipment and the interrelationships of these items in practicing the process of the invention.

Figure 2:
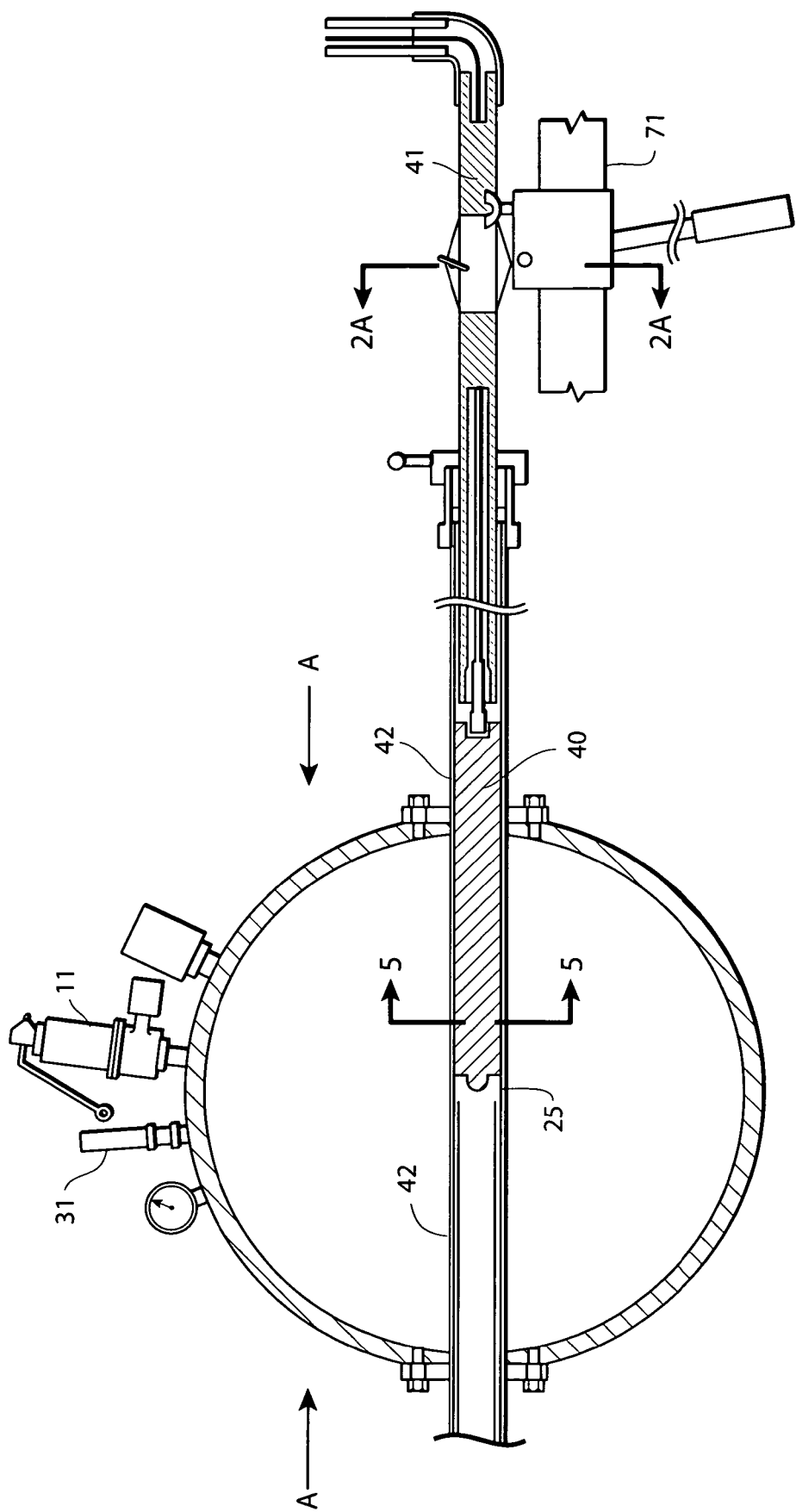
FIG. 2 depicts the a reactor for practicing the process of the invention.

A fluid-tight reaction vessel 10 is provided with a pressure relief valve 11. Elongate sacrificial electrodes ("Me"), shown in greater detail in FIG. 2, formed from the elemental metal moiety of the desired metal oxide product (MeO) are axially fed into the vessel 10 by electrode feeders 12. The inner opposed ends of the electrodes are also held spaced apart a minimum distance by a ceramic grate 13 and immersed in water 14.

Electrical power ("P") 20 is supplied to a high-voltage, low-current power supply 21 and a lower-voltage, constant current power supply 22. Power control circuitry 23 selectively feeds either high voltage-low current electrical power from the power supply 21 or lower-voltage, high current electrical power from the power supply 22, thru circuit 24 to each of the sacrificial anodes in a manner hereafter described in FIGS. 2–4, to initiate and maintain an electrical arc plasma zone in the space 25 between the inner opposed ends of the sacrificial electrodes.

The pressure in the reactor 10 is maintained at below the relief pressure of the valve 11 by venting hydrogen gas through valve 30, through the conduit 31 to dryer 32, from which the dried hydrogen 33 is compressed 34 and accumulated in storage cylinder 35.

A suspension of the metal oxide formed at the plasma zone 25 in water is withdrawn through valve 51 and sent via conduit 52 to a filter 53 to separate the solid metal oxide 54 from the water 55. The metal oxide 54 is dried 56 and may be subjected to optional sizing steps, etc. to produce the final metal oxide ("MeO") product 57.

The water 55 separated from the mixed metal oxide-water suspension 52 may be cooled at cooler 58, sent to an accumulator 60 and then recirculated via conduits 50 to the reactor 10. Makeup water ("$H_2O$"), to maintain a sufficient level of water 14 in the reactor 10 covering the sacrificial electrodes is added via inlet line 59 to the accumulator 60. The pump 61 raises the pressure of the water in the lines 50 to a pressure sufficiently above the pressure in the reactor 10 to maintain the flow of recirculated water 55 and makeup water 59 through the lines 50 into the reactor 10 and provide a water bearing around the electrodes 40 to assist moving them through the electrode feeders into the reactor 10.

Referring now to FIGS. 2–5, elongate sacrificial electrodes 40 are fed axially into the reactor 10 toward the plasma zone 25 by moving the electrode bus assemblies 41 in the direction of the arrows A, forcing the electrodes 40 coaxially inwardly through the electrode carriers 42, toward the plasma zone 25. A stationary rail 71 carries a manually operated lever 72 which is pivotally mounted on rail carriage 73 and is also pivotally connected to the electrode bus clamp 77. Thumb screw 75, on the rail carriage 73, and thumb screw 76 on the electrode bus clamp 77 are manipulated to permit the rail carriage 73 and electrode bus clamp 77 to be releaseably positioned on the rail 71 and the electrode bus 41, to permit the operator to manually adjust the axial position of the electrode bus 41, thus controlling the axial position of the electrodes 40 and the space between the opposed ends thereof by manipulating the lever 72 in the directions of the arrows C.

Referring now more particularly to FIGS. 3–4B the electrode bus 41 consists of hollow electrode driver 81, fabricated from a high strength polymer such as Delran or Nylon. Insulated electrical conduit 24 connected to the power controller 23 passes through associated piping 82 and is electrically and mechanically connected at its distal end 83 to the electrode connector 84, which carries at its distal end in a self-tapping plug 85. The proximal end 86 of the plug 85 is located coaxially with the electrode driver 81 by means of set pins 87. Recirculating cooled water and makeup water 50 from pump 61 is directed through the annular space between the electrical cable 24 and the associated piping 82 and exits at the distal end of the electrode driver 81, thereby cooling the driver 81, the plug 85 and the electrical conduit 24.

After the sacrificial electrodes 40 are continuously consumed at the plasma zone 25, additional sacrificial electrodes are loaded into the electrode driver cases 42 by removing the locks 92 and coupling plugs 91 threadably connected to the proximal end of the driver cases 42.

As will be apparent to those skilled in the art, the driver cases 42 can be made longer to accommodate a plurality of sacrificial electrodes located axially in the driver cases 42, thereby lengthening the time during which the process and apparatus can be continuously operated. Similarly, the manual control of the axial position of the electrodes can be automated with suitable hydraulic or electrically operated mechanisms, controlled by sensing the current necessary to maintain the electrical spark and associated plasma zone 25.

In operation, the reactor 10 is preferably maintained at superatmospheric pressure to minimize the water content of the byproduct hydrogen and to increase the reaction rate at the electric arc plasma zone 25. According to the presently preferred practice, the pressure relief valve is set to vent at 900 psig and the pressure in the reactor 10 is maintained at approximately 800–850 psig. The exact reactor pressure is not critical and higher and lower pressures down to atmospheric pressure are operable.

The temperature of the liquid phase in the reactor 10 is maintained at below the boiling point of water at the operating pressure selected. This temperature is maintained by cooling 56 the recirculating water 55 fed to the reactor 10 and, if necessary, by cooling fins added to the reactor and associated water piping.

To insure the purity of the metal oxide product, the water initially charged into the reactor 10 and the makeup water added via inlet line 59 is preferably distilled water.

The electrical power 24 applied to the sacrificial anodes is regulated by controller 23 to furnish an initial high voltage surge from the high voltage power supply 21, on the order of 2,000 volts, so as to strike the arc between the sacrificial electrodes at a spacing of approximately ¼–½ inch. After the arc is established and the current spikes upwardly, the controller 23 switches the current from the high-voltage supply 21 to the constant current supply 22, which continues to supply power to the sacrificial electrodes at a lower voltage and higher current on the order of 70 volts and 200 amps.

The elongate sacrificial electrodes are sized for convenient handling. In the presently preferred embodiment of the invention the electrodes are cylindrically shaped, approximately 2½ inches in diameter and 36 inches long. The proximal ends of the anodes are provided with a cylindrical socket 40A into which the tapered self-threading plug 85 of the electrode driver 84 can be engaged.

Figure 5:
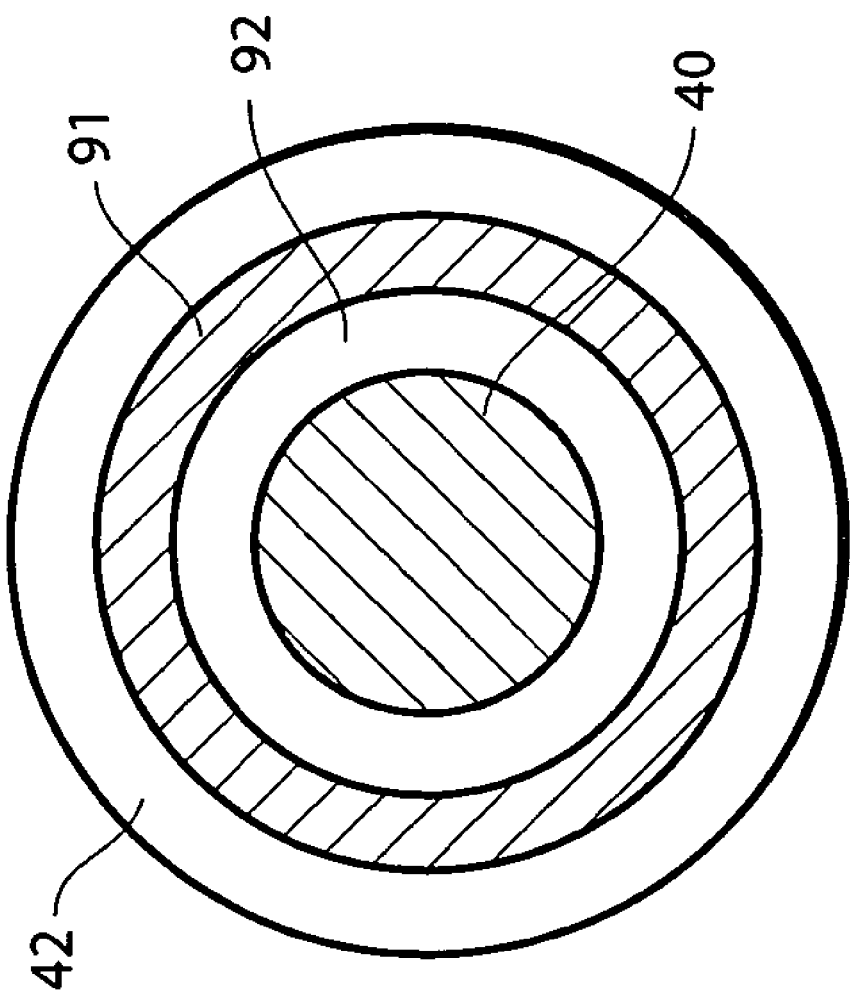
FIG. 5 is a sectional view of the electrode feeding apparatus of FIGS. 2–4B, taken along section line 5—5 of FIG. 2.

Referring now more particularly to FIG. 5, the conduits 51 for feeding the electrodes 40 into the reactor 10 are lined inside with an insulating polymer layer 91. These conduits 51 and the polymer layer 91 are sized to provide approximately 1/16 inch annular space 92 between the electrodes 40 and the inner polymer lining 91, through which the recycled and makeup water 50 can pass to cool these conduits and to introduce the cooled, recycled water plus makeup water into the reactor 10. (On FIG. 5, the thicknesses of the polymer layer 91 and the annular space 92 are exaggerated for clarity of illustration.)

Having described the invention in such terms as to enable those skilled in the art to understand and practice it, and, having identified the presently preferred embodiments thereof,

The invention claimed is:

1. A process for manufacturing a metal oxide product and byproduct hydrogen, said process comprising the steps of:
   (a) positioning sacrificial electrodes, formed from the elemental metal of said metal oxide product, spaced apart in a reaction zone maintained at superatmospheric pressure;
   (b) introducing sufficient distilled water into said reaction zone to cover said electrodes, and continuously maintaining said sufficient water therein;
   (c) applying an electrical potential to said sacrificial electrodes sufficient to generate an arc there between, forming an electrical discharge plasma zone in said water between said electrodes, and regulating said electrical potential to continuously maintain said arc;
   (d) continuously withdrawing from said reaction zone a mixture of water and said metal oxide product continuously formed at said plasma zone;
   (e) continuously separating said metal oxide product from said withdrawn water-metal oxide mixture by filtration and drying said metal oxide product;
   (f) continuously withdrawing from said reaction zone said hydrogen byproduct formed at said plasma zone, and drying and storing said hydrogen byproduct;
   (g) cooling said water separated from said water-metal oxide mixture; and
   (h) recycling said cooled water and make-up distilled water to said reaction zone, using at least a part of said cooled recycled and make-up water to cool said sacrificial electrodes.

* * * * *